US011025871B1

(12) United States Patent
Magoz et al.

(10) Patent No.: US 11,025,871 B1
(45) Date of Patent: Jun. 1, 2021

(54) DRIVING SCANNING PROJECTOR DISPLAY WITH PULSES SHORTER THAN PIXEL DURATION

(71) Applicant: Facebook Technologies, LLC, Menlo Park, CA (US)

(72) Inventors: Ziv Magoz, Seattle, WA (US); James Laudolff, Issaquah, WA (US); Daniel Guenther Greif, Redmond, WA (US); Scott Charles McEldowney, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/414,397

(22) Filed: May 16, 2019

Related U.S. Application Data

(60) Provisional application No. 62/829,491, filed on Apr. 4, 2019.

(51) Int. Cl.
*G09G 3/02* (2006.01)
*H04N 9/31* (2006.01)
*G02B 26/10* (2006.01)
*G09G 3/32* (2016.01)
*G03B 21/20* (2006.01)

(52) U.S. Cl.
CPC ........... *H04N 9/3123* (2013.01); *G02B 26/10* (2013.01); *G03B 21/2033* (2013.01); *G09G 3/32* (2013.01); *H04N 9/3155* (2013.01)

(58) Field of Classification Search
CPC .. G06F 3/011–015; G05B 2219/36432; G05B 2219/39449; G05B 2219/39451; G05B 2219/40131
See application file for complete search history.

(56) References Cited

U.S. PATENT DOCUMENTS

| 6,232,963 | B1* | 5/2001 | Tew | G09G 3/3406 |
| | | | | 345/102 |
| 2003/0015652 | A1* | 1/2003 | Kandori | G02B 26/101 |
| | | | | 250/234 |
| 2012/0169777 | A1* | 7/2012 | Budni | G09G 3/2051 |
| | | | | 345/690 |
| 2016/0005375 | A1* | 1/2016 | Naijo | G09G 3/38 |
| | | | | 345/690 |
| 2016/0379606 | A1* | 12/2016 | Kollin | G06T 3/4038 |
| | | | | 345/428 |
| 2018/0003991 | A1* | 1/2018 | Guillaumee | G02B 27/0179 |
| 2018/0373041 | A1* | 12/2018 | Sugawara | G02B 26/10 |

\* cited by examiner

*Primary Examiner* — Sanghyuk Park
(74) *Attorney, Agent, or Firm* — Pequignot + Myers; Matthew A. Pequignot (57) ABSTRACT

A driver for powering a pulsed light source of a scanning projector display is configured to provide a succession of powering electric pulses to the light source. Duration of the powering electric pulses is less than a pixel time interval during which a scanner of the projector display is directing the light beam to form a corresponding pixel of the image to be displayed. The amplitude of the powering electric pulses is proportionally higher, such that the light pulse has a pulse energy similar to the light energy provided by the light source when continuously driven through the pixel time interval. This enables the light source to be operated at a steeper portion of the electro-optical transfer curve, thereby improving the wall plug efficiency of the scanning projector display.

18 Claims, 9 Drawing Sheets

DRIVING SCANNING PROJECTOR DISPLAY WITH PULSES SHORTER THAN PIXEL DURATION

REFERENCE TO RELATED APPLICATION

The present application claims priority from U.S. Provisional application No. 62/829,491, filed on Apr. 4, 2019 and incorporated herein by reference in its entirety.

TECHNICAL FIELD

The present disclosure relates to wearable headsets, and in particular to optical components and modules for a wearable display or a near-eye display.

BACKGROUND

Head-mounted displays (HMDs), near-eye displays (NEDs), and other wearable display systems can be used to present virtual scenery to a user, or to augment real scenery with dynamic information, data, or virtual objects. The virtual reality (VR) or augmented reality (AR) scenery can be three-dimensional (3D) to enhance the experience and to match virtual objects to real objects observed by the user. Eye position and gaze direction, and/or orientation of the user may be tracked in real time, and the displayed scenery may be dynamically adjusted depending on the user's head orientation and gaze direction, to provide a better experience of immersion into a simulated or augmented environment.

Scanning projector displays provide an image in angular domain, which can be directly observed by a user. The absence of a screen or a display panel in a scanning projector display may allow a significant weight and size reduction of the display system. A scanning projector display may benefit from using a compact, bright, fast, and energy-efficient light source, as well as a corresponding electronic driver configured to operate such a light source.

SUMMARY

In accordance with the present disclosure, there is provided a driver for providing a succession of powering electric pulses to a light source for providing a light beam comprising a succession of light pulses corresponding to the succession of powering electric pulses. The light beam is coupled to a scanning projector display for displaying an image comprising a plurality of pixels. A duration of a powering electric pulse of the succession of powering electric pulses is less than a pixel time interval during which a scanner of the scanning projector display is directing the light beam to form a corresponding pixel of the image.

The driver may be configured to provide the powering electric pulses having at least an amplitude or duration such that a pulse energy of light pulses provided by the light source when driven by the powering electric pulses is equal to a nominal energy of the light beam when the light source is driven at a constant driving current during the entire pixel time interval.

In some embodiments, the driver is configured to control energy of the light pulses for displaying the image by controlling an amplitude of the powering electric pulses such that a pulsewidth of the powering electric pulses is no greater than one third of the pixel time interval. In some embodiments, the driver is configured to provide the powering electric pulses in a middle of the corresponding pixel time intervals during which a scanner of the scanning projector display is directing the light beam to the corresponding pixels of the image.

In accordance with the present disclosure, there is provided a scanning projector display comprising a light source for providing a light beam comprising a succession of light pulses, a driver operably coupled to the light source for powering the light source for providing the light beam, a scanner optically coupled to the light source for scanning the light beam for displaying an image comprising a plurality of pixels, and a controller operably coupled to the scanner and the driver and configured for operating the driver for providing powering electric pulses to the light source. Durations (i.e. pulsewidth) of the powering electric pulses are less than pixel time intervals during which a scanner of the scanning projector display is directing the light beam to form corresponding pixels of the image. For example, the pulsewidth of the powering electric pulses may be less than 10 nanoseconds, or even less than 5 nanoseconds. The driver may be further configured to provide the powering electric pulses in a middle of the corresponding pixel time intervals during which a scanner of the scanning projector display is directing the light beam to the corresponding pixels of the image.

In some embodiments, the light source comprises at least one of a single-mode light source or a multimode light source. The light source may include at least one of a side-emitting laser diode, a vertical-cavity surface-emitting laser diode, a superluminescent light-emitting diode, or another type of a light-emitting diode. Pulse energy of the powering electric pulses may remain lower than a threshold energy equal to the pixel time interval multiplied by a threshold power. In embodiments where the light source comprises a superluminescent LED (SLED), the threshold power may be equal to a lasing threshold electric power of the SLED. In some embodiments, the light source further includes a body supporting the light source, the driver the scanner, and the controller. The body may have a form factor of a pair of glasses.

In accordance with the present disclosure, there is further provided a method for displaying an image. The method includes using a scanner to angularly scan a light beam for displaying the image, the light beam including a succession of light pulses corresponding to pixels of the image. A pointing angle of the scanner is determined, and an energy of a light pulse to be emitted is determined in accordance with the determined pointing angle of the scanner. A light-emitting diode (LED) is energized by providing a powering electric pulse to the LED. The powering electric pulse has an energy corresponding to the determined energy of the light pulse to be emitted. A duration of the powering electric pulse is less than a pixel time interval during which the scanner is directing the light beam to form a corresponding pixel of the image.

In some embodiments, determining the energy of the light pulse to be emitted comprises determining an amplitude and/or duration of the light pulse to be emitted, and/or determining an amplitude and/or of the powering electric pulse. The powering electric pulse may be provided in a middle of the pixel time interval during which the scanner is directing the light beam to form the corresponding pixel of the image.

BRIEF DESCRIPTION OF THE DRAWINGS

Exemplary embodiments will now be described in conjunction with the drawings, in which.

DETAILED DESCRIPTION

Figure 1:
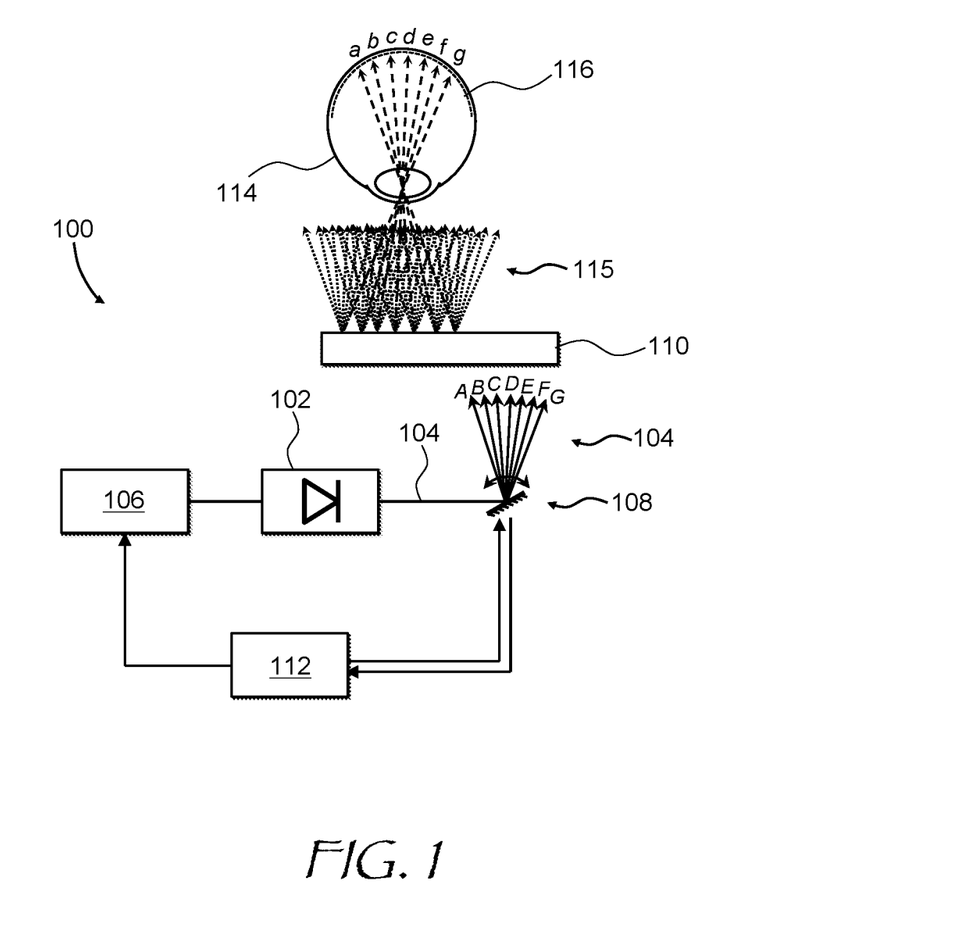
FIG. 1 is a schematic view of a projection display illustrating its principle of operation.
Figure 6A:
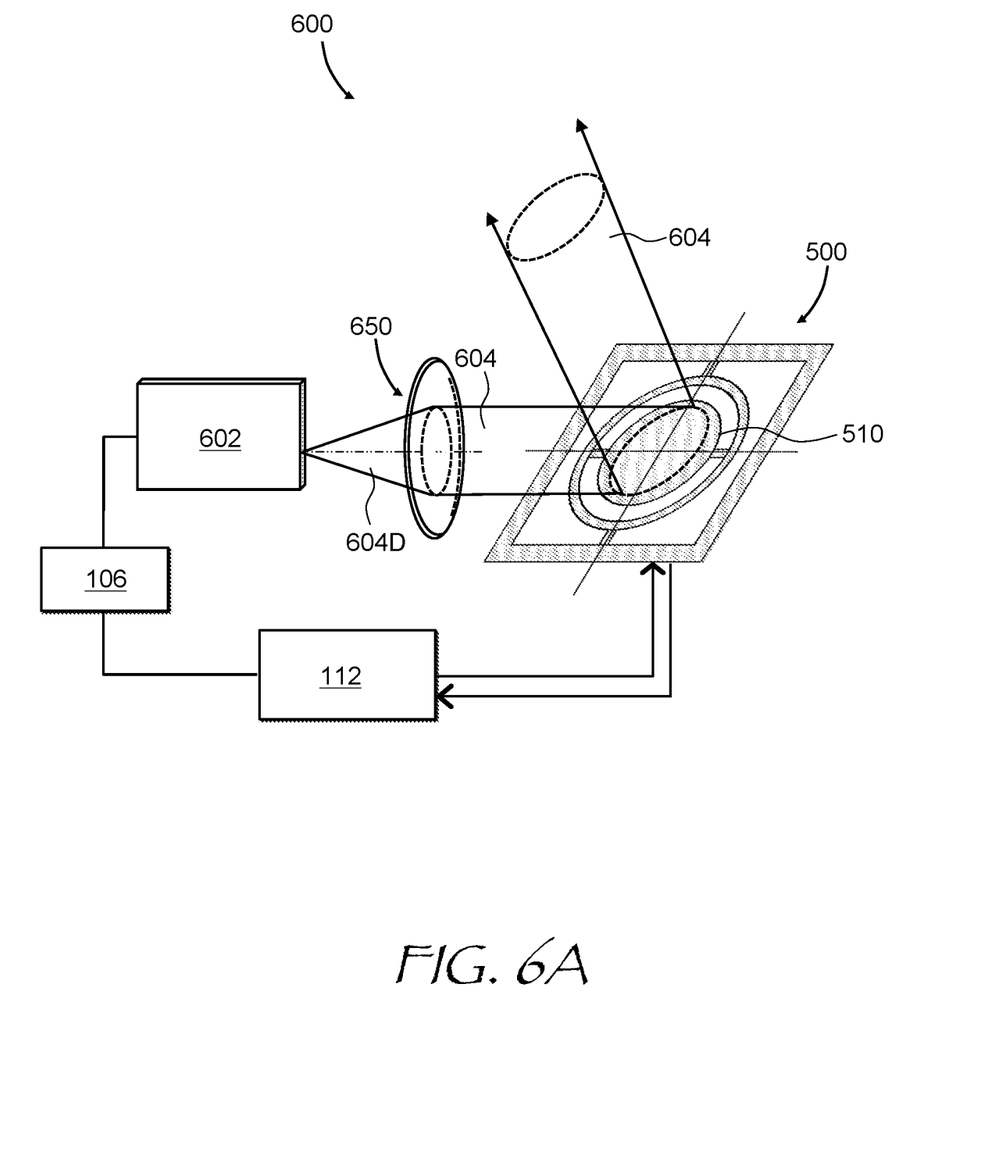
FIG. 6A is a schematic view of a microelectromechanical system (MEMS) scanning projector display using a superluminescent LED (SLED) array as a light source.
Figure 6B:
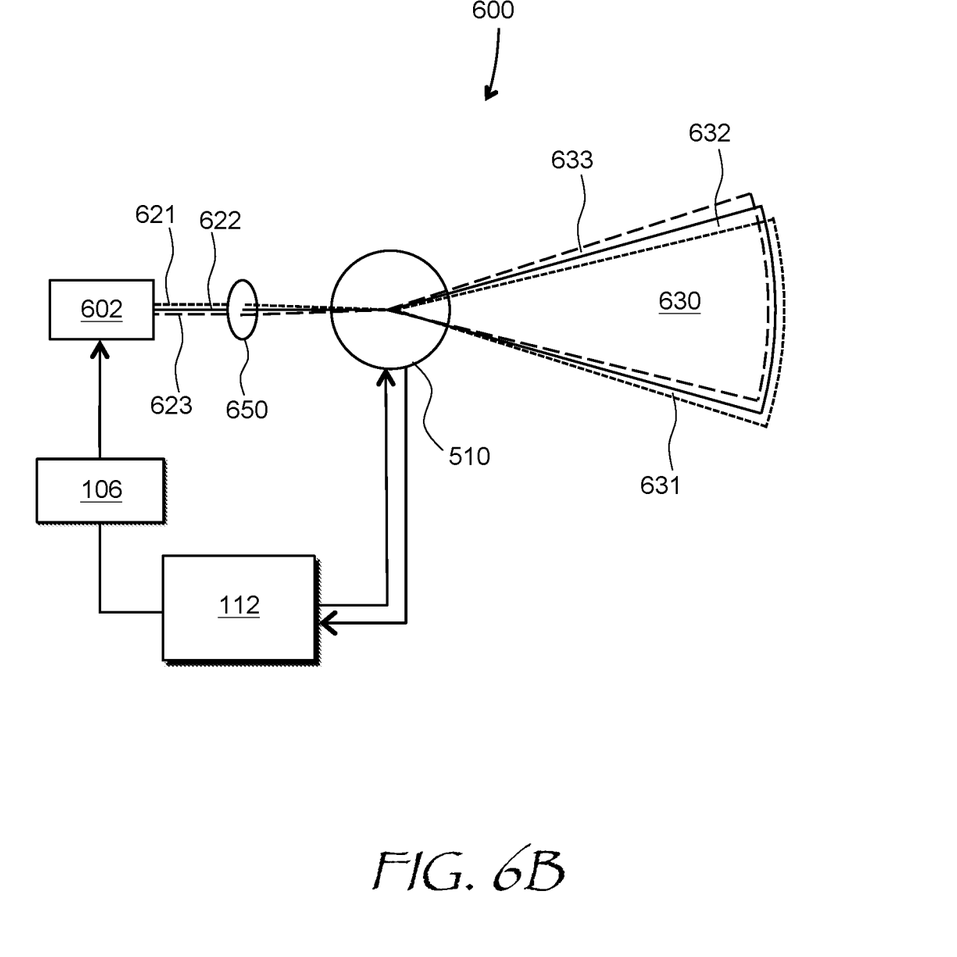
FIG. 6B is a schematic top view of the scanning projector display of FIG. 6A illustrating a relationship between fields of view provided by individual emitters of the SLED array.

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. In FIGS. 1, 6A, and 6B, similar reference numerals denote similar elements.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated.

Power consumption is one of key parameters of a near-eye display system. A light source of the scanning projector used to raster the virtual image is a major contributor to power consumption. Projectors that use semiconductor light sources may have poor wall plug efficiency due to a combination of factors. One such factor is a high threshold current for semiconductor devices such as lasers, VCSELs or SLEDs. Below the threshold, no light is produced; and above the threshold, the relationship between output light level and current follows a non-linear relationship, until at some point, the relationship becomes quasi-linear. To optimize overall efficiency, it is desirable to operate in a top portion of the quasi-linear range of the curve, i.e. substantially above the threshold current. However, if the required output light level is too low, the semiconductor light source may be forced to operate in a low-efficiency portion of the electro-optical transfer characteristic, which lowers the wall plug efficiency of the display system.

One way to mitigate this deficiency is to operate the device at much higher light output levels, but for a shorter period of time than a pixel time interval, i.e. a time interval when the projector is directing the light beam to a particular pixel of the image being displayed. This enables the display device to be operated further away from the threshold current and, accordingly, at a higher wall plug efficiency. Operation high above the threshold current may be particularly advantageous when superluminescent LEDs (SLEDs) are used as a light source.

In SLEDs, the initial relationship between current and output power is highly non-linear. To achieve higher wall plug efficiency, the SLED may be operated in a short-pulse mode, where a peak electric current is at a high-steepness, quasi-linear portion of the SLED electro-optical transfer curve, thereby increasing electrical-to-optical conversion efficiency and thus increasing overall wall plug efficiency of the SLED light source. Care must be taken such that lasing of the SLED does not develop. The lasing or output power instability may develop due to undesired backreflections in the optical path, as well due to driving SLED with too high a current above its lasing threshold.

Referring to FIG. 1, a scanning projector display 100 includes a solid-state light source 102 for providing a light beam 104. The solid-state light source 102 may include a single-mode light source or a multimode light source, e.g. a light-emitting diode (LED) or a superluminescent light-emitting diode (SLED), a side-emitting laser diode, a vertical cavity surface-emitting laser diode (VCSEL), etc. An electronic driver 106 is operably coupled to the light source 102 for powering the light source 102. A scanner 108, e.g. a tiltable microelectromechanical system (MEMS) reflector, an acousto-optic modulator, a diffractive scanner, etc., is optically coupled to the light source 102 for scanning the light beam 104 generated by the light source 102. The scanning may be performed in one or two dimensions, e.g. about an X-axis and/or Y-axis perpendicular to the X-axis, where X- and Y-axes are in plane of the MEMS mirror at its normal i.e. unpowered position. Pre-tilt of MEMS mirror may also be used. A pupil replicator 110 provides a light field 115 including multiple laterally displaced parallel copies of the scanned light beam 104, which repeat the beam angle, i.e. a direction of propagation of the light beam 104 at every moment of time as the light beam 104 is scanned about one or two axes, as the case may be.

A controller 112 is operably coupled to the scanner 108 and the electronic driver 106. The controller 112 is configured for operating the electronic driver 106 for powering the light source 102 in coordination with driving the scanner 108 and reading its position. For example, the controller 112 may cause the scanner 108 to scan the light beam 104 through a succession of beam angles or directions "A" through "G", while causing the electronic driver 106 to change the brightness of the light source 102 in accordance with an image to be displayed, thus forming an image in angular domain for direct observation by a viewer's eye 114. A feedback circuit may be provided to indicate the current MEMS mirror position to the controller 112.

The pupil replicator 110 provides multiple laterally displaced parallel copies of the scanned light beam 104 in directions "A" through "G", as illustrated. The viewer's eye 114 receives the light field 115, and forms an image at the eye's retina 116 from the corresponding replicated light beams, as shown. A linear position of the beam copies on the eye's retina 116 is denoted with letters "a" through "g", and corresponds to the beam angles or directions "A" through "G" of the scanned light beam 104. In this manner, the eye 114 forms a linear image on the eye's retina 116 from the image in the angular domain formed by the light field 115. In some embodiments, the driver 106 is configured to control energy of the light pulses for displaying the image by controlling at least one of amplitude or pulse width of the powering pulses used to energize the light source.

Figure 2:
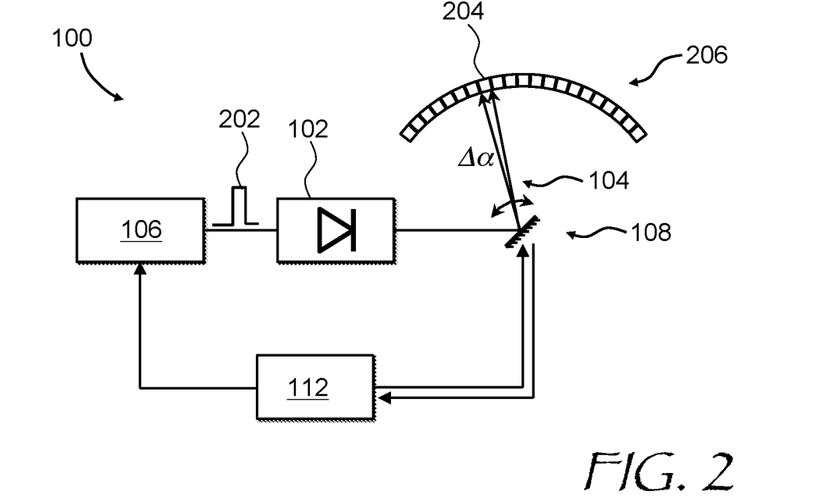
FIG. 2 is a schematic view of the projection display of FIG. 1 scanning across a pixel of an image.

Turning to FIG. 2, the electronic driver 106 may be configured for providing powering pulses 202 to the light source 102, such that a pulsewidth of the powering pulses 202 is less than a time interval during which the scanner 108 of the projector display 100 is directing the light beam 104 through an angular range $\Delta\alpha$ corresponding to a current pixel 204 of the image being displayed. Pixels 206, including the currently displayed pixel 204, are shown in FIG. 2 in an arc configuration, to illustrate that the image being generated is in angular domain where each beam angle corresponds to a pixel of the image. The energy of the powering pulses 202 may be selected in accordance with the current pixel 204 (or pixels) being displayed at any given moment of time. It is noted that the term "pixel" as used herein refers to an element of an image being displayed, which may or may not be related to a "pixel" as an element of a detector array or an element of a visual display panel comprising an array of light-emitting pixels.

Figure 3A:
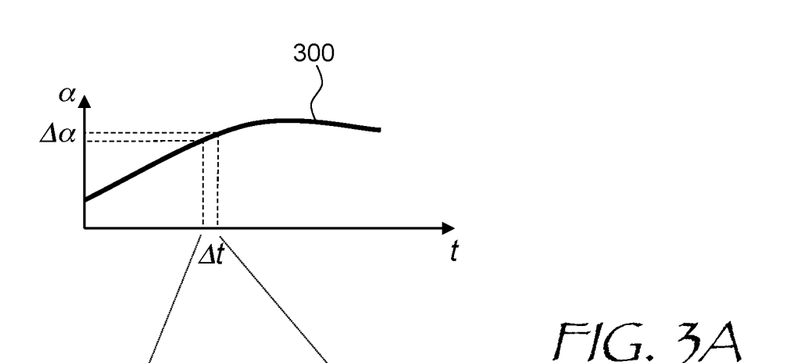
FIG. 3A is a graph of a scanner's pointing angle vs. time.
Figure 3B:
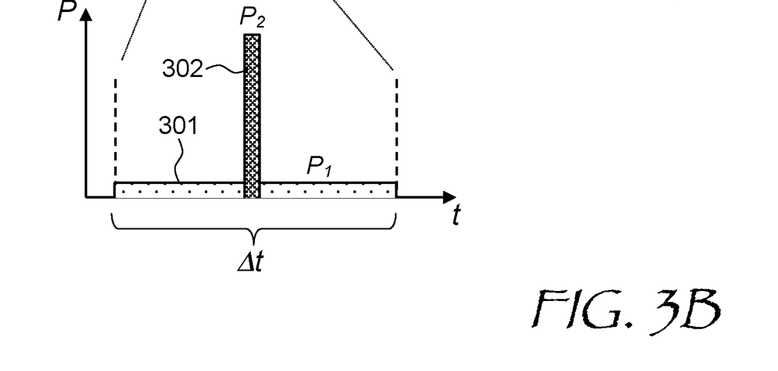
FIG. 3B is a graph of the LED output power vs. time during scanning across the pixel of FIG. 2.

FIGS. 3A and 3B illustrate the timing of the powering of the light source 102. A scanning angle 300 of the scanner 108 (FIGS. 1 and 2) runs through the angular range $\Delta\alpha$ of the currently displayed pixel 204 (FIG. 2) corresponding to a time interval $\Delta t$ (FIGS. 3A and 3B). In some embodiments, the time duration of a powering pulse 302 is shorter than $\Delta t$, and may be much shorter, e.g. no grater than one third of $\Delta t$, one tenth of $\Delta t$, one hundredth of $\Delta t$, and even less than one thousandth of $\Delta t$.

In some embodiments, a pulse energy of a light pulse provided by the light source 102 when driven by the powering pulse is approximately, e.g. to within 10-20%, equal to a nominal energy of the light beam when the light source is driven at a constant driving current during the pixel time interval. Herein, the term "nominal" energy refers to an energy of the light beam that corresponds to the brightness of a pixel of the currently displayed image. For example, referring specifically to FIG. 3B, a nominal energy of the light beam 104 accumulated during the time interval $\Delta t$ is $\Delta t * P_1$, where $P_1$ is a nominal optical power level, at which the light source 102, e.g. an SLED, would be normally operated if the light source 102 were to be powered at the power level $P_1$ throughput the entire time interval $\Delta t$. The light energy emitted during the time interval $\Delta t$ can be represented by a rectangle 301. Since the time duration of the powering pulse 302 is shorter than $\Delta t$, the optical power level $P_2$ of the powering pulse 302 can be made proportionally higher, such that the light energy is about the same (e.g. within 10-20%) as $\Delta t * P_1$. In other words, approximately the same number of photons is emitted in the powering pulse 302 but during much shorter time interval than $\Delta t$.

The latter condition may be expressed as $$\int_{\Delta t} P(t)dt = P_1 \cdot \Delta t \quad (1)$$

Figure 4:
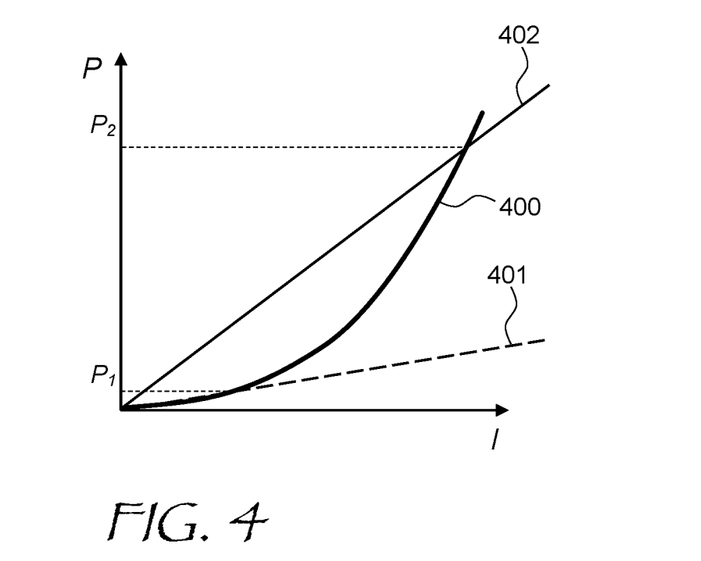
FIG. 4 is the LED's transfer curve illustrating operation of the LED at different driving currents corresponding to different plug efficiency levels.

The power levels $P_1$ and $P_2$ are plotted in an electro-optical transfer curve 400 of FIG. 4. When the light source 102 is driven at a constant or slowly varying optical power level throughout the entire pixel time interval, the power efficiency, represented by a slope of a dashed straight line 401, may remain rather low. When, however, the light source 102 is driven in a pulsed mode, i.e. by the powering pulses 302, the corresponding power efficiency, represented by a slope of a solid straight line 402, may be much higher. Thus, the overall wall plug efficiency of the scanning projector display 100 may be improved while providing a substantially same capability of rendering an image at a pre-defined brightness level.

In some embodiments, the pulse energy of the powering electric pulses is lower than a threshold energy equal to the pixel time interval multiplied by some threshold power. For SLED power sources, the threshold power may be represented by an electric power which, when supplied to the SLED, may cause undesired lasing or output power instability due to parasitic feedback. The threshold electric power may be computed as square of a lasing threshold electric current divided by an effective electric resistance of the SLED p-n junction at that current. The threshold energy may also need to remain below a threshold related to optical safety, i.e. below a safe light energy to be directed to the viewer's eye 114, as required by a laser safety standard, for example. In some embodiments, the pulsewidth may be less than 10 nanoseconds or shorter, e.g. less than 5 nanoseconds and even less then 2 nanoseconds. The driver 106 and/or the controller 112 may be configured to provide the powering pulse in a middle of the pixel time interval during which the scanner 108 of the projector display 100 is directed to a corresponding pixel of the image, for a better centering of the displayed pixels of the image.

Figure 5:
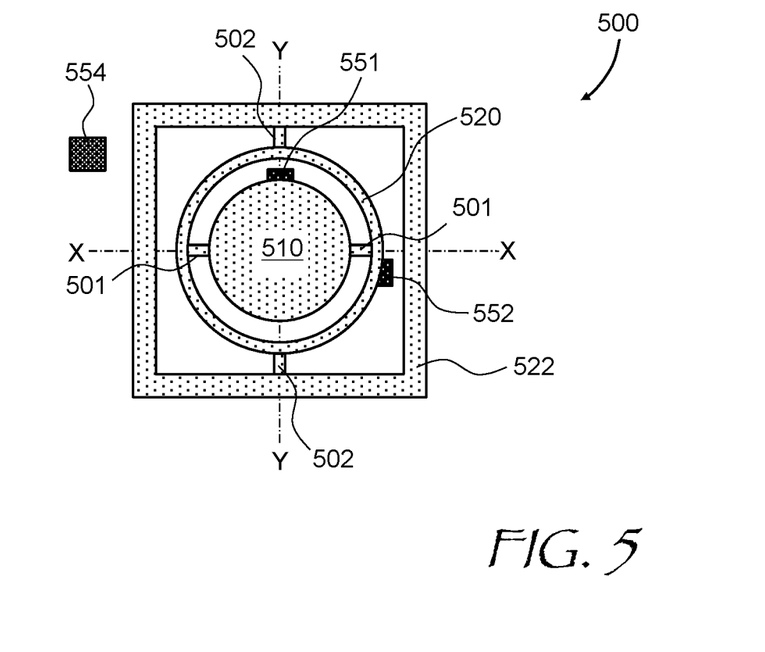
FIG. 5 is a plan view of a 2D scanning microelectromechanical system (MEMS) mirror.

Referring to FIG. 5, a two-dimensional (2D) microelectromechanical system (MEMS) scanner 500 includes a reflector 510, e.g. a mirror or a diffraction grating, supported by a pair of first torsional hinges 501 allowing tilting the reflector 510 about X axis. The first torsional hinges 501 extend from the reflector 510 to a gimbal ring 520, which is supported by a pair of second torsional hinges 502 extending from the gimbal ring 520 to a fixed base 522, for tilting of the gimbal ring 520 and the reflector 510 about Y axis. Actuators may be disposed underneath the reflector 510 and/or the gimbal ring 520 for providing a force for actuating the tilt of the reflector 510 about X and Y axes. The actuators may be electrostatic, electro-magnetic, piezo-electric, etc. For electrostatic mirror actuation, the comb drive may be located on the torsional hinge members. For example, in the embodiment shown in FIG. 5, a first actuator 551 may be disposed under an edge of the reflector 510 to tilt the reflector 510 about X-axis. A second actuator 552 may be disposed under the gimbal ring 520 for tilting the gimbal ring 520 and the reflector 510 about Y-axis. It is noted that reflector 510 may be offset from a center of a corresponding substrate, if needed.

A feedback circuit 554 may be provided for determining the X- and Y-angles of tilt of the reflector 510. The feedback circuit 554 may measure electric capacitance between the first electrostatic actuator 551 and the reflector 510 to determine the X-tilt, and electric capacitance between the second electrostatic actuator 552 and the gimbal ring 520 to determine the Y-tilt. Separate electrodes may also be provided specifically for the feedback circuit 554. In some embodiments, the feedback circuit 554 may provide a sync or triggering pulses when the reflector 510 is tilted at a certain X- and/or Y-angle, including zero angle.

Turning to FIG. 6A, a scanning projector display 600 includes a multi-emitter light source assembly 602 including e.g. a SLED array for providing a diverging optical beam 604D. An optional collimator 650 is optically coupled to the multi-emitter light source assembly 602, to collimate the diverging optical beam 604D and provide a collimated optical beam 604. A scanner, such as the 2D MEMS scanner 500 of FIG. 5, is optically coupled to the collimator 650. The controller 112 can be operably coupled to the electronic driver 106, which is coupled to the multi-emitter light source assembly 602. The controller 112 is also coupled to the 2D MEMS scanner 500 for tilting the reflector 510 of the 2D MEMS scanner 500.

The collimator 650, e.g. a lens, is optically coupled to the pulsed light source 602 for collimating the diverging optical beam 604D to obtain the collimated optical beam 604. Any optical component having optical power, i.e. focusing or collimating power, such as a concave mirror, a diffractive lens, a folded-beam freeform optical element, etc., may be used in the collimator 650. The reflector 510 of the 2D MEMS scanner 500 is optically coupled to the collimator 650 for receiving and angularly scanning the collimated optical beam 604.

The electronic driver 106 is configured for providing powering electric pulses to energize the multi-emitter light source assembly 602. The controller 112 sends commands to the electronic driver 106 to energize the multi-emitter light source assembly 602 in coordination with tilting the 2D MEMS scanner 500, for "painting" or rastering an image in angular domain. When viewed by a human eye, the image in angular domain is projected by the eye's cornea and lens to become a spatial-domain image on the eye's retina, as explained above with reference to FIG. 1. A pulsewidth of the powering electric pulses is less than a time interval during which the 2D MEMS scanner 500 is directing the light beam 604 to form a corresponding pixel of the image. Similarly to what has been explained above with reference to FIGS. 2 to 4, this enables one to improve the wall plug efficiency of the multi-emitter light source assembly 602 and the scanning projector display 600 as a whole.

In some embodiments, the scanner of the projector display may include a 1D tiltable mirror. For this embodiment, a linear array of light sources may be used to provide a plurality of image pixels in a direction perpendicular to the direction of scanning. The linear array of light sources may also be used in a 2D scanner, as well. In some embodiments, the 2D MEMS scanner 500 may be replaced with a pair of 1D tiltable mirrors, one for scanning about X axis, and the other for scanning about Y axis. The two 1D tiltable mirrors may be optically coupled e.g. via a pupil relay. Other types of scanners may be used, for example diffractive or acousto-optic scanners.

The multi-emitter light source assembly 602 may include single-mode or multimode light sources, e.g. a side-emitting laser diode, a vertical-cavity surface-emitting laser diode, a superluminescent light-emitting diode, or a light-emitting diode. The pulse energy of the light pulse may be selected to be lower than a threshold energy equal to the pixel time interval multiplied by a threshold optical power of the light source. For SLED light sources, the threshold optical power of the SLED may be a lasing threshold optical power of the SLED.

The operation of the projector 600 is further illustrated in FIG. 6B. In this example, the multi-emitter light source assembly 602 includes three emitters providing three beams (only chief rays shown) 621 (dotted lines), 622 (solid lines), and 623 (dashed lines). The collimator 650 collimates the beams 621, 622, and 623. By selecting suitable geometry e.g. distances and focal length of the collimator 650, the latter may also cause the beams 621, 622, and 623 to impinge onto a center of the reflector 510 at slightly different angles of incidence, for scanning all three beams 621, 622, and 623 together. Since the angles of incidence of the beams 621, 622, and 623 onto the tiltable reflector 510 are different, respective scanning areas 631 (dotted lines), 632 (solid lines), and 633 (dashed lines) of the beams 621, 622, and 623, respectively, are mutually offset as shown. The controller 112 may take these spatial offsets into account by providing corresponding delays to the driving signals of the three emitters of the multi-emitter light source assembly 602. Spatial offsets in combination with the delays in energizing individual emitters may be provided such as to effectively triple the spatial resolution of the projector 600 in a common scan area 630, as compared to a case of a single emitter.

Figure 7:
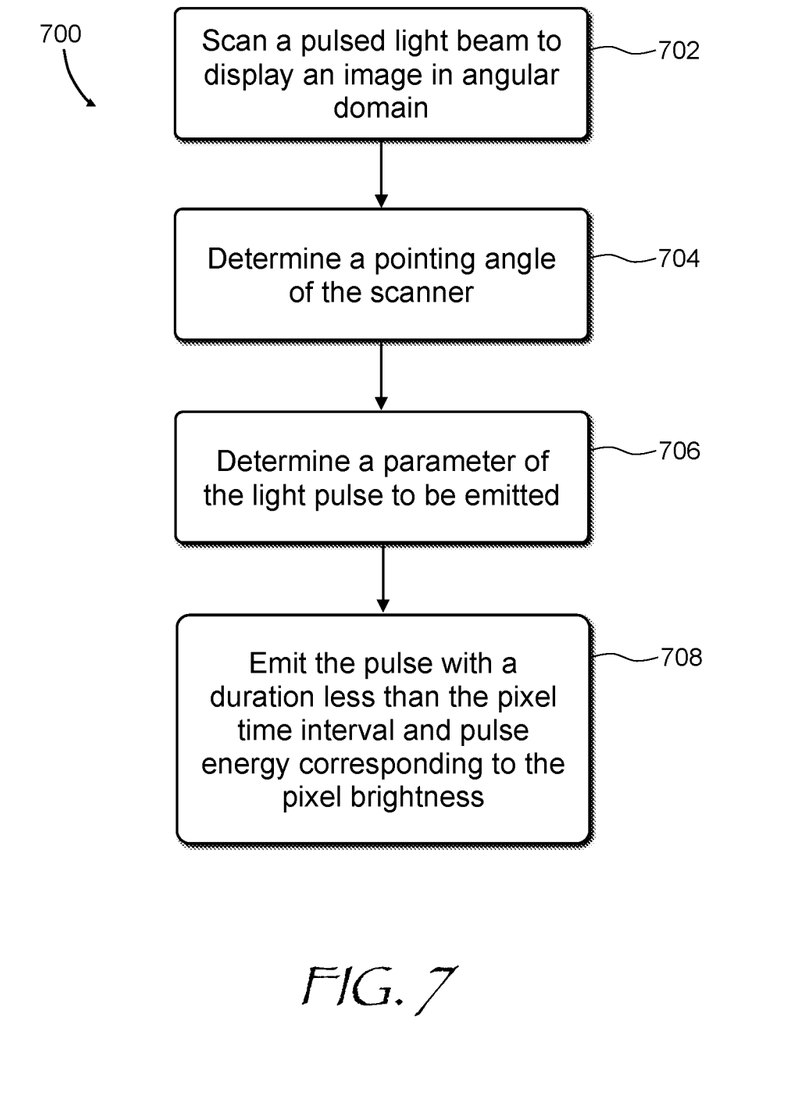
FIG. 7 is a flow chart of a method for displaying an image.

Referring to FIG. 7, a method 700 for displaying an image includes using a scanner, such as the scanner 108 of FIG. 1 or the 2D MEMS scanner 500 of FIG. 5, to angularly scan (FIG. 7; 702) a light beam e.g. the light beam 104 (FIG. 1) or the collimated light beam 604 (FIG. 6A), for displaying an image by rastering the light beam in sync with varying the power level of the light beam. The light beam is pulsed, i.e. it includes a succession of light pulses of variable energy, depending upon brightness of the image pixels energized by the corresponding light pulses. By way of example, the light source 102 emits light pulses when powered by the powering pulses 202 generated by the electronic driver 106 (FIGS. 1 and 2). The controller 112 coordinates the timing of the powering pulses 202 with the angular scanning by the scanner 108.

A pointing angle of the scanner may be determined (FIG. 7; 704) e.g. from the driving signal, or from a mirror position sensor reporting a current tilt angle of the reflector 510 (FIG. 5). The pointing angle may be pre-determined by the driving signals, or, for resonant or bi-resonant scanning of the MEMS mirror, obtained from the driving signals and sync signals provided by the mirror position sensors. Furthermore, in some cases, a scanning trajectory of the MEMS mirror may be predicted to enable the proper timing of the light source driving signals to be configured in advance.

A parameter of the light pulse to be emitted is determined based on the current pixel(s) of the image to be displayed (706), that is, the pixel(s) pointed at by the scanner. By way of non-limiting examples, the pulse energy, the pulse amplitude, the pulse duration, or the color of the emitted beam may be determined (for color light sources). The required color may be provided by energizing light sources emitting light at different wavelengths. These multi-color light sources such as an LED, an SLED, etc., may be energized simultaneously, sequentially, or with a programmed delay. The light source 102 is energized by providing a powering electric pulse (e.g. the powering pulse 202 in FIG. 2) to the light source 102. The determined light pulse amplitude and/or duration may be used to determine an amplitude and/or duration of the corresponding powering electric pulse. In other words, the powering electric pulse has an amplitude and a duration corresponding to the amplitude and duration of the light pulse to be emitted.

The parameters of the powering electric pulses to be applied to the light source 102 may be determined e.g. from the electro-optic response curve 400 of FIG. 4. As explained above, the duration of the powering pulses is less than the pixel time interval $\Delta t$ during which the scanner 108 of the projector display 100 is directing the light beam to a pixel (e.g. the currently displayed pixel 204 in FIG. 2) of the image. The pulse may then be emitted (708). The pulse energy of the emitted pulse corresponds to the brightness of the currently displayed pixel. The process may then proceed to shifting the scanner to a next pixel to be displayed, determining the parameters of the light pulses to be emitted, determining the corresponding electric powering pulse parameters (e.g. amplitude, duration, etc.), and emitting the next pulse. The process repeats until all pixels of the image have been displayed or "painted" by the scanning projector display.

Figure 8:
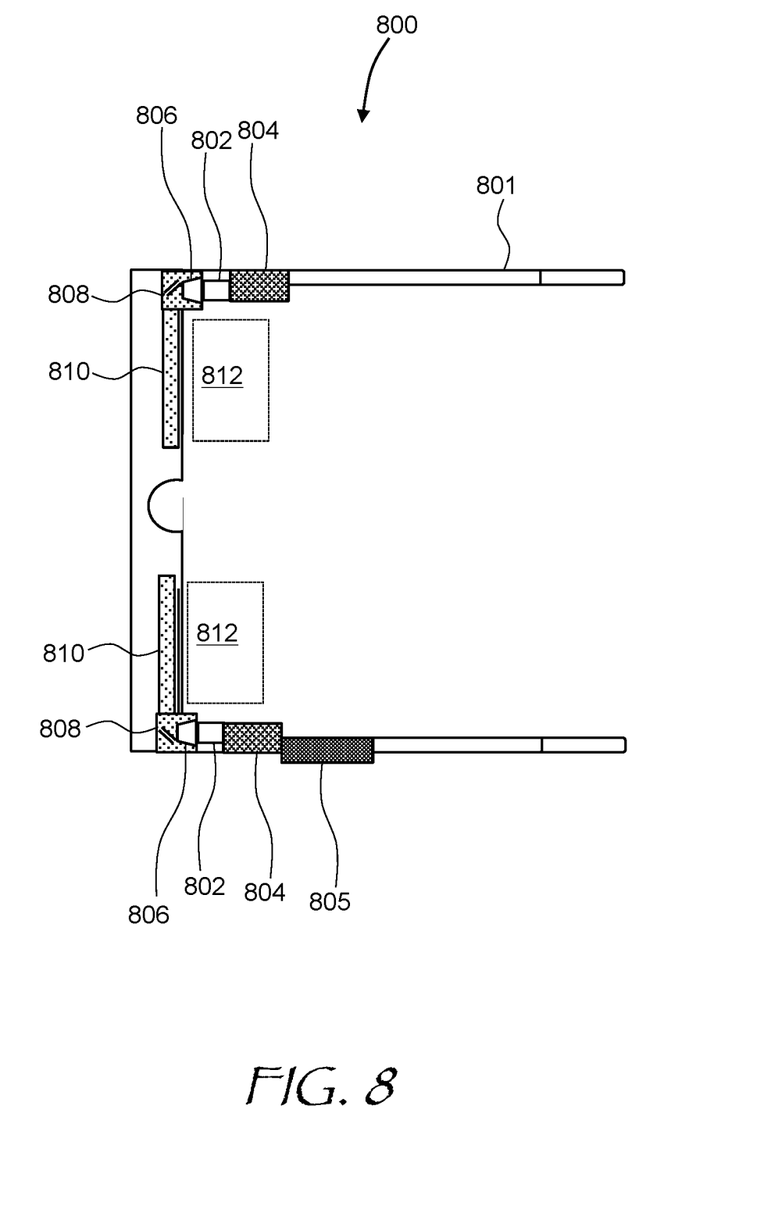
FIG. 8 is a schematic top view of a near-eye display including a scanning projector display disclosed herein.

Referring now to FIG. 8, a near-eye display 800 includes a frame 801 having a form factor of a pair of glasses. The frame 801 supports, for each eye: a light source subassembly 802, an electronic driver 804 operably coupled to the light source subassembly 802 for powering the light source subassembly 802 for providing at least one light beam, a collimator 806 optically coupled to light source subassembly 802 for collimating the light beam, a scanner 808, e.g. a tiltable reflector, optically coupled to the collimator 806, and a pupil replicator 810 optically coupled to the scanner 808. The light source subassembly 802 may include a substrate supporting an array of single-mode or multimode semiconductor light sources, e.g. side-emitting laser diodes, vertical-cavity surface-emitting laser diodes, SLEDs, or light-emitting diodes, for providing a plurality of light beams. A controller 805 is operably coupled to the scanners 808 and the electronic drivers 804. The controller 805 is configured for driving the scanner 808 and reading its position, and operating the electronic drivers 804 for providing powering electric pulses to the light source subassemblies 802 in accordance with the position of the scanner 808. As explained above, the pulsewidth of the powering electric pulses is less than a time interval during which the scanners 808 of the near-eye display 800 are directing the light beams to form a corresponding pixel of the image.

The collimators 806 may include a concave mirror, a bulk lens, a Fresnel lens, a holographic lens, etc., and may be integrated with the light source subassembly 802. The scanners 808 may include the 2D MEMS scanner 500 of FIG. 5, for example, or a pair of 1D tiltable reflectors optically coupled via a pupil relay. The function of the pupil replicators 810 is to provide multiple laterally offset copies of the light beams redirected or scanned by the scanner 808 at eyeboxes 812, as has been explained above with reference to FIG. 1.

Embodiments of the present disclosure may include, or be implemented in conjunction with, an artificial reality system. An artificial reality system adjusts sensory information about outside world obtained through the senses such as visual information, audio, touch (somatosensation) information, acceleration, balance, etc., in some manner before presentation to a user. By way of non-limiting examples, artificial reality may include virtual reality (VR), augmented reality (AR), mixed reality (MR), hybrid reality, or some combination and/or derivatives thereof. Artificial reality content may include entirely generated content or generated content combined with captured (e.g., real-world) content. The artificial reality content may include video, audio, somatic or haptic feedback, or some combination thereof. Any of this content may be presented in a single channel or in multiple channels, such as in a stereo video that produces a three-dimensional effect to the viewer. Furthermore, in some embodiments, artificial reality may also be associated with applications, products, accessories, services, or some combination thereof, that are used to, for example, create content in artificial reality and/or are otherwise used in (e.g., perform activities in) artificial reality. The artificial reality system that provides the artificial reality content may be implemented on various platforms, including a wearable display such as an HMD connected to a host computer system, a standalone HMD, a near-eye display having a form factor of eyeglasses, a mobile device or computing system, or any other hardware platform capable of providing artificial reality content to one or more viewers.

Figure 9A:
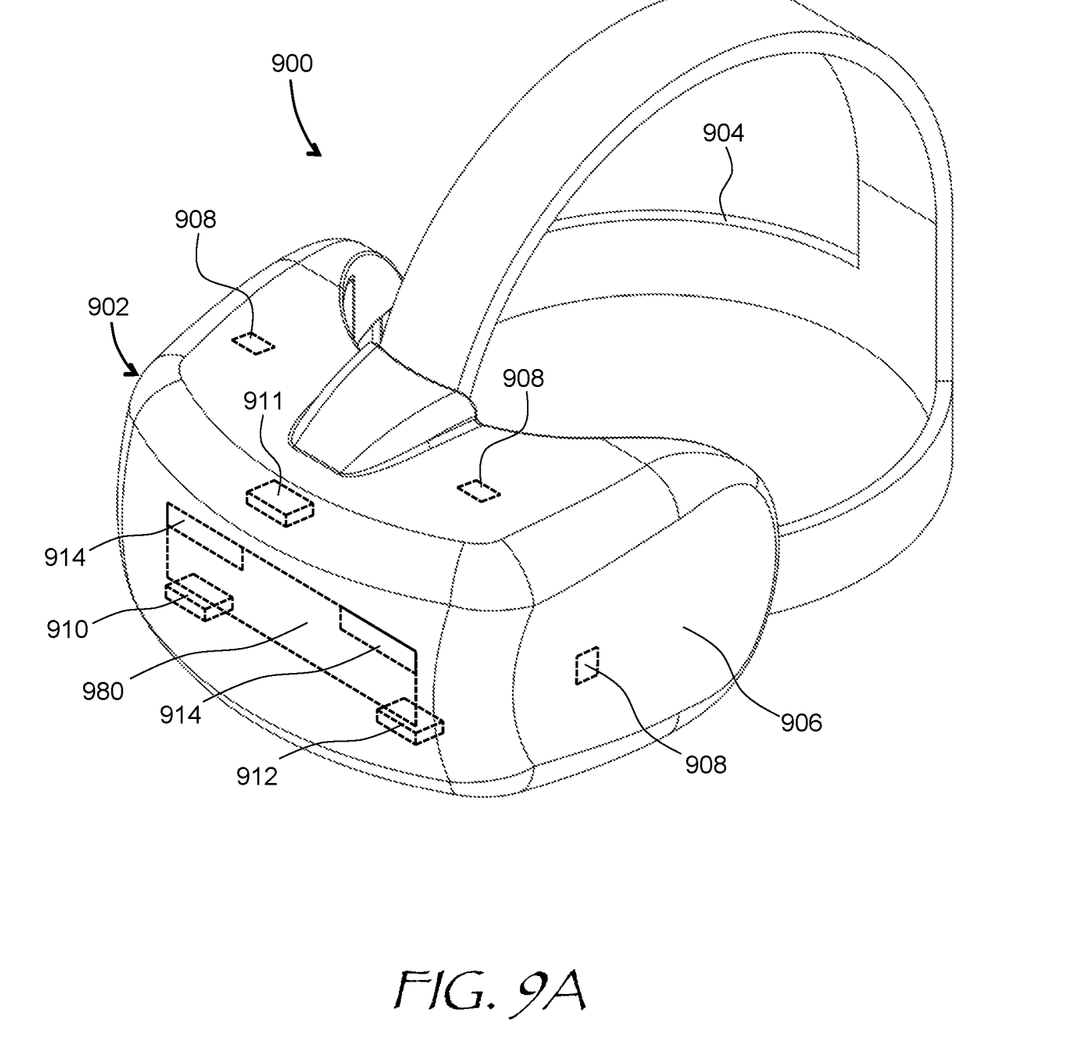
FIG. 9A is an isometric view of a head-mounted display (HMD) of the present disclosure.

Referring to FIG. 9A, an HMD 900 is an example of an AR/VR wearable display system which encloses the user's face, for a greater degree of immersion into the AR/VR environment. The HMD 900 may include electronic drivers and scanning projector displays described herein, e.g. the scanning projector display 100 of FIGS. 1 and 2, or the scanning projector display 600 of FIGS. 6A and 6B. The function of the HMD 900 is to augment views of a physical, real-world environment with computer-generated imagery, and/or to generate the entirely virtual 3D imagery. The HMD 900 may include a front body 902 and a band 904. The front body 902 is configured for placement in front of eyes of a user in a reliable and comfortable manner, and the band 904 may be stretched to secure the front body 902 on the user's head. A display system 980 may be disposed in the front body 902 for presenting AR/VR imagery to the user. Sides 906 of the front body 902 may be opaque or transparent.

In some embodiments, the front body 902 includes locators 908 and an inertial measurement unit (IMU) 910 for tracking acceleration of the HMD 900, and position sensors 912 for tracking position of the HMD 900. The IMU 910 is an electronic device that generates data indicating a position of the HMD 900 based on measurement signals received from one or more of position sensors 912, which generate one or more measurement signals in response to motion of the HMD 900. Examples of position sensors 912 include: one or more accelerometers, one or more gyroscopes, one or more magnetometers, another suitable type of sensor that detects motion, a type of sensor used for error correction of the IMU 910, or some combination thereof. The position sensors 912 may be located external to the IMU 910, internal to the IMU 910, or some combination thereof.

The locators 908 are traced by an external imaging device of a virtual reality system, such that the virtual reality system can track the location and orientation of the entire HMD 900. Information generated by the IMU 910 and the position sensors 912 may be compared with the position and orientation obtained by tracking the locators 908, for improved tracking accuracy of position and orientation of the HMD 900. Accurate position and orientation is important for presenting appropriate virtual scenery to the user as the latter moves and turns in 3D space.

The HMD 900 may further include a depth camera assembly (DCA) 911, which captures data describing depth information of a local area surrounding some or all of the HMD 900. To that end, the DCA 911 may include a laser radar (LIDAR), or a similar device. The depth information may be compared with the information from the IMU 910, for better accuracy of determination of position and orientation of the HMD 900 in 3D space.

The HMD 900 may further include an eye tracking system 914 for determining orientation and position of user's eyes in real time. The obtained position and orientation of the eyes also allows the HMD 900 to determine the gaze direction of the user and to adjust the image generated by the display system 980 accordingly. In one embodiment, the vergence, that is, the convergence angle of the user's eyes gaze, is determined. The determined gaze direction and vergence angle may also be used for real-time compensation of visual artifacts dependent on the angle of view and eye position. Furthermore, the determined vergence and gaze angles may be used for interaction with the user, highlighting objects, bringing objects to the foreground, creating additional objects or pointers, etc. An audio system may also be provided including e.g. a set of small speakers built into the front body 902.

Figure 9B:
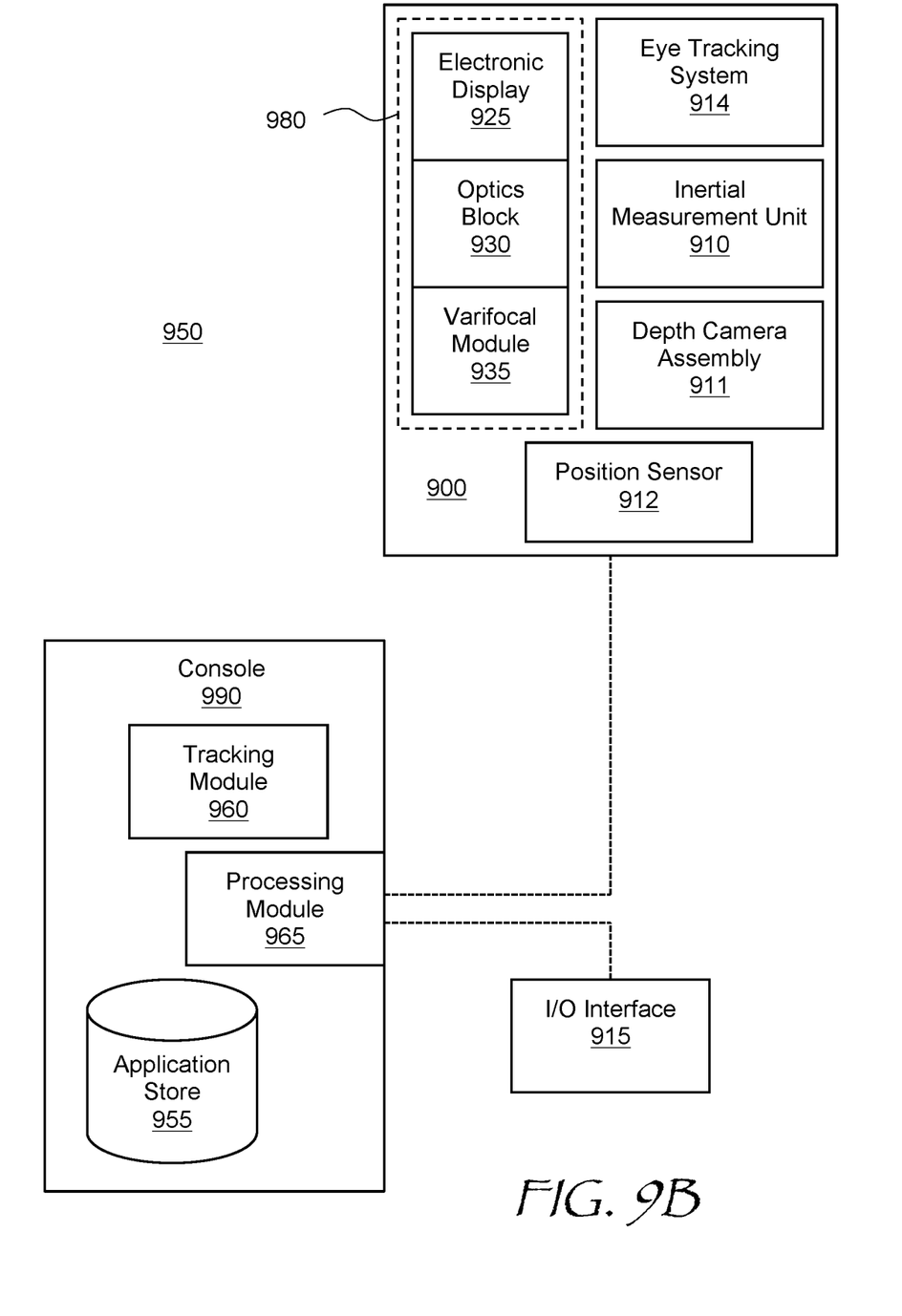
FIG. 9B is a block diagram of a virtual reality system including the HMD of FIG. 11A.

Referring to FIG. 9B, an AR/VR system 950 may include electronic drivers, light sources, and projector displays disclosed herein. The AR/VR system 950 includes the HMD 900 of FIG. 9A, an external console 990 storing various AR/VR applications, setup and calibration procedures, 3D videos, etc., and an input/output (I/O) interface 915 for operating the console 990 and/or interacting with the AR/VR environment. The HMD 900 may be "tethered" to the console 990 with a physical cable, or connected to the console 990 via a wireless communication link such as Bluetooth®, Wi-Fi, etc. There may be multiple HMDs 900, each having an associated I/O interface 915, with each HMD 900 and I/O interface(s) 915 communicating with the console 990. In alternative configurations, different and/or additional components may be included in the AR/VR system 950. Additionally, functionality described in conjunction with one or more of the components shown in FIGS. 9A and 9B may be distributed among the components in a different manner than described in conjunction with FIGS. 9A and 9B in some embodiments. For example, some or all of the functionality of the console 915 may be provided by the HMD 900, and vice versa. The HMD 900 may be provided with a processing module capable of achieving such functionality.

As described above with reference to FIG. 9A, the HMD 900 may include the eye tracking system 914 (FIG. 9B) for tracking eye position and orientation, determining gaze angle and convergence angle, etc., the IMU 910 for determining position and orientation of the HMD 900 in 3D space, the DCA 911 for capturing the outside environment, the position sensor 912 for independently determining the position of the HMD 900, and the display system 980 for displaying AR/VR content to the user. The display system 980 may include, for example, the scanning projector display 100 of FIGS. 1 and 2, the scanning projector display 600 of FIGS. 6A and 6B. The display system 980 may include an optics block 930, whose function is to convey the images generated by the electronic display 925 to the user's eye. The optics block may include various lenses, e.g. a refractive lens, a Fresnel lens, a diffractive lens, an active or passive Pancharatnam-Berry phase (PBP) lens, a liquid lens, a liquid crystal lens, etc., a pupil-replicating waveguide, grating structures, coatings, etc. The display system 980 may further include a varifocal module 935, which may be a part of the optics block 930. The function of the varifocal module 935 is to adjust the focus of the optics block 930 e.g. to compensate for vergence-accommodation conflict, to correct for vision defects of a particular user, to offset aberrations of the optics block 930, etc.

The I/O interface 915 is a device that allows a user to send action requests and receive responses from the console 990. An action request is a request to perform a particular action. For example, an action request may be an instruction to start or end capture of image or video data or an instruction to perform a particular action within an application. The I/O interface 915 may include one or more input devices, such as a keyboard, a mouse, a game controller, or any other suitable device for receiving action requests and communicating the action requests to the console 990. An action request received by the I/O interface 915 is communicated to the console 990, which performs an action corresponding to the action request. In some embodiments, the I/O interface 915 includes an IMU that captures calibration data indicating an estimated position of the I/O interface 915 relative to an initial position of the I/O interface 915. In some embodiments, the I/O interface 915 may provide haptic feedback to the user in accordance with instructions received from the console 990. For example, haptic feedback can be provided when an action request is received, or the console 990 communicates instructions to the I/O interface 915 causing the I/O interface 915 to generate haptic feedback when the console 990 performs an action.

The console 990 may provide content to the HMD 900 for processing in accordance with information received from one or more of: the IMU 910, the DCA 99, the eye tracking system 914, and the I/O interface 915. In the example shown in FIG. 9B, the console 990 includes an application store 955, a tracking module 960, and a processing module 965. Some embodiments of the console 990 may have different modules or components than those described in conjunction with FIG. 9B. Similarly, the functions further described below may be distributed among components of the console 990 in a different manner than described in conjunction with FIGS. 9A and 9B.

The application store 955 may store one or more applications for execution by the console 990. An application is a group of instructions that, when executed by a processor, generates content for presentation to the user. Content generated by an application may be in response to inputs received from the user via movement of the HMD 900 or the I/O interface 915. Examples of applications include: gaming applications, presentation and conferencing applications, video playback applications, or other suitable applications.

The tracking module 960 may calibrate the AR/VR system 950 using one or more calibration parameters and may adjust one or more calibration parameters to reduce error in determination of the position of the HMD 900 or the I/O interface 915. Calibration performed by the tracking module 960 also accounts for information received from the IMU 910 in the HMD 900 and/or an IMU included in the I/O interface 915, if any. Additionally, if tracking of the HMD 900 is lost, the tracking module 960 may re-calibrate some or all of the AR/VR system 950.

The tracking module 960 may track movements of the HMD 900 or of the I/O interface 915, the IMU 910, or some combination thereof. For example, the tracking module 960 may determine a position of a reference point of the HMD 900 in a mapping of a local area based on information from the HMD 900. The tracking module 960 may also determine positions of the reference point of the HMD 900 or a reference point of the I/O interface 915 using data indicating a position of the HMD 900 from the IMU 910 or using data indicating a position of the I/O interface 915 from an IMU included in the I/O interface 915, respectively. Furthermore, in some embodiments, the tracking module 960 may use portions of data indicating a position or the HMD 900 from the IMU 910 as well as representations of the local area from the DCA 911 to predict a future location of the HMD 900. The tracking module 960 provides the estimated or predicted future position of the HMD 900 or the I/O interface 915 to the processing module 965.

The processing module 965 may generate a 3D mapping of the area surrounding some or all of the HMD 900 ("local area") based on information received from the HMD 900. In some embodiments, the processing module 965 determines depth information for the 3D mapping of the local area based on information received from the DCA 911 that is relevant for techniques used in computing depth. In various embodiments, the processing module 965 may use the depth information to update a model of the local area and generate content based in part on the updated model.

The processing module 965 executes applications within the AR/VR system 950 and receives position information, acceleration information, velocity information, predicted future positions, or some combination thereof, of the HMD 900 from the tracking module 960. Based on the received information, the processing module 965 determines content to provide to the HMD 900 for presentation to the user. For example, if the received information indicates that the user has looked to the left, the processing module 965 generates content for the HMD 900 that mirrors the user's movement in a virtual environment or in an environment augmenting the local area with additional content. Additionally, the processing module 965 performs an action within an application executing on the console 990 in response to an action request received from the I/O interface 915 and provides feedback to the user that the action was performed. The provided feedback may be visual or audible feedback via the HMD 900 or haptic feedback via the I/O interface 915.

In some embodiments, based on the eye tracking information (e.g., orientation of the user's eyes) received from the eye tracking system 914, the processing module 965 determines resolution of the content provided to the HMD 900 for presentation to the user on the electronic display 925. The processing module 965 may provide the content to the HMD 900 having a maximum pixel resolution on the electronic display 925 in a foveal region of the user's gaze. The processing module 965 may provide a lower pixel resolution in other regions of the electronic display 925, thus lessening power consumption of the AR/VR system 950 and saving computing resources of the console 990 without compromising a visual experience of the user. In some embodiments, the processing module 965 can further use the eye tracking information to adjust where objects are displayed on the electronic display 925 to prevent vergence-accommodation conflict and/or to offset optical distortions and aberrations.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A driver for providing a succession of powering electric pulses to a light source for providing a light beam comprising a succession of light pulses corresponding to the succession of powering electric pulses;
   wherein the light beam is coupled to a scanning projector display for rastering an image comprising a plurality of pixels by scanning the light beam to provide the image pixel-by-pixel, each light pulse of the succession of light pulses corresponding to a particular pixel of the plurality of pixels, wherein a duration of a powering electric pulse of the succession of powering electric pulses is less than a pixel time interval during which a scanner of the scanning projector display is directing the light beam to form a single pixel of the image; and
   wherein the driver is configured to control energy of the light pulses for displaying the image by controlling an amplitude of the powering electric pulses.

2. The driver of claim 1, configured to provide the powering electric pulses having an amplitude such that a pulse energy of light pulses provided by the light source when driven by the powering electric pulses is equal to an energy of the light beam when the light source is driven at a constant driving current during the entire pixel time interval to provide a pixel of a pre-defined brightness.

3. The driver of claim 1, wherein a pulsewidth of the powering electric pulses is no greater than one third of the pixel time interval.

4. The driver of claim 3, wherein the driver is configured to provide the powering electric pulses in a middle of the corresponding pixel time intervals during which a scanner of the scanning projector display is directing the light beam to the corresponding pixels of the image.

5. A scanning projector display comprising:
   a light source for providing a light beam comprising a succession of light pulses;
   a driver operably coupled to the light source for providing a succession of powering electric pulses to the light source to provide the succession of light pulses thereby;
   a scanner optically coupled to the light source for scanning the light beam for rastering an image comprising a plurality of pixels by scanning the light beam to provide the image pixel-by-pixel, each light pulse of the succession of light pulses corresponding to a particular pixel of the plurality of pixels; and
   a controller operably coupled to the scanner and the driver and configured for operating the driver, wherein durations of the powering electric pulses are less than a pixel time interval during which the scanner is directing the light beam to form a single pixel of the image;
   wherein the driver is configured to control energy of the light pulses for displaying the image by controlling an amplitude of the powering electric pulses.

6. The scanning projector display of claim 5, wherein the light source comprises at least one of a single-mode light source or a multimode light source.

7. The scanning projector display of claim 6, wherein the light source comprises at least one of a side-emitting laser diode, a vertical-cavity surface-emitting laser diode, a superluminescent light-emitting diode, or a light-emitting diode.

8. The scanning projector display of claim 5, wherein pulse energy of the powering electric pulses is lower than a threshold energy equal to the pixel time interval multiplied by a threshold power.

9. The scanning projector display of claim 8, wherein the light source comprises a superluminescent LED (SLED), wherein the threshold power is a lasing threshold electric power of the SLED.

10. The scanning projector display of claim 5, wherein a pulsewidth of the powering electric pulses is less than 10 nanoseconds.

11. The scanning projector display of claim 10, wherein a pulsewidth of the powering electric pulses is less than 5 nanoseconds.

12. The scanning projector display of claim 5, wherein the driver is configured to provide the powering electric pulses in a middle of the corresponding pixel time intervals during which a scanner of the scanning projector display is directing the light beam to the corresponding pixels of the image.

13. The scanning projector display of claim 5, further comprising a body supporting the light source, the driver the scanner, and the controller, wherein the body has a form factor of a pair of glasses.

14. The scanning projector display of claim 5, wherein the light source comprises an array of superluminescent LEDs.

15. A method for displaying an image, the method comprising:
using a scanner to angularly scan a light beam for rastering the image, the light beam comprising a succession of light pulses, each pulse corresponding to a particular individual pixel of the image;
determining a pointing angle of the scanner;
in accordance with the determined pointing angle of the scanner, determining an energy of a light pulse to be emitted; and
energizing a light-emitting diode (LED) by providing a powering electric pulse to the LED, the powering electric pulse having an energy corresponding to the determined energy of the light pulse to be emitted;
wherein a duration of the powering electric pulse is less than a pixel time interval during which the scanner is directing the light beam to form a single pixel of the image;
wherein determining the energy of the light pulse to be emitted comprises determining an amplitude of the light pulse to be emitted.

16. The method of claim 15, wherein determining the amplitude of the light pulse to be emitted comprises determining an amplitude of the powering electric pulse.

17. The method of claim 15, wherein determining the amplitude of the light pulse to be emitted comprises determining a duration of the powering electric pulse.

18. The method of claim 15, wherein the powering electric pulse is provided in a middle of the pixel time interval during which the scanner is directing the light beam to form the corresponding pixel of the image.

* * * * *